(12) United States Patent
Nohren

(10) Patent No.: US 6,277,284 B1
(45) Date of Patent: Aug. 21, 2001

(54) POUR THROUGH AND LOCKING SPILL PROOF CAP

(75) Inventor: John E. Nohren, Clearwater, FL (US)

(73) Assignee: Innova Pure Water Inc., Clearwater, FL (US)

( * ) Notice: Subject to any disclaimer, the term of this patent is extended or adjusted under 35 U.S.C. 154(b) by 0 days.

(21) Appl. No.: 09/302,328

(22) Filed: Apr. 30, 1999

Related U.S. Application Data

(60) Provisional application No. 60/084,061, filed on May 4, 1998.

(51) Int. Cl.[7] .............................. B01D 27/02; C02F 1/28
(52) U.S. Cl. ............................................. 210/660; 210/282
(58) Field of Search ..................................... 210/660, 807, 210/282, 429, 446, 473, 232, 474; 222/481

(56) References Cited

U.S. PATENT DOCUMENTS

| | | | |
|---|---|---|---|
| 4,695,379 | 9/1987 | Nohren, Jr. et al. | 210/282 |
| 4,769,144 | 9/1988 | Nohren, Jr. | 210/282 |
| 5,211,973 | 5/1993 | Nohren, Jr. | 426/82 |
| 5,431,813 | * 7/1995 | Daniels | 210/282 |
| 5,609,759 | 3/1997 | Nohren, Jr. et al. | 210/266 |
| 5,919,365 | * 7/1999 | Collette | 210/446 |

OTHER PUBLICATIONS

Innova Clearwater System literature, 1990.

* cited by examiner

Primary Examiner—Ivars Cintins
(74) Attorney, Agent, or Firm—Nixon & Vanderhye P.C.

(57) ABSTRACT

A water treatment system including a bottle with a neck, a tube for disposition within the bottle and having water treatment material (such as activated carbon for removing a significant portion of the chlorine in tap water) associated with it, and a cap. The bottle is filled by causing water to flow through the tube, through the water treatment material, into the bottle. When filled, the bottle neck is closed off by screwing the cap into contact with the neck, the cap closing off the tube so that water does not flow through the tube out of the bottle, but rather exteriorly of the tube through openings in a cap first element and between the tube and the neck. A second element of the cap releasably closes off the water flow openings. In order to prevent leakage of water from the bottle even when tilted or dropped, the cap second element may be twisted with respect to the first element to lock the elements together in the closed position, and this—combined with the substantially elastomeric material sealing ring between the cap first element and the bottle—substantially prevents water from flowing out of the neck of the bottle. The water treatment material may easily be changed by removing a canister from an end of the tube and inserting a new canister into contact with the tube.

20 Claims, 4 Drawing Sheets

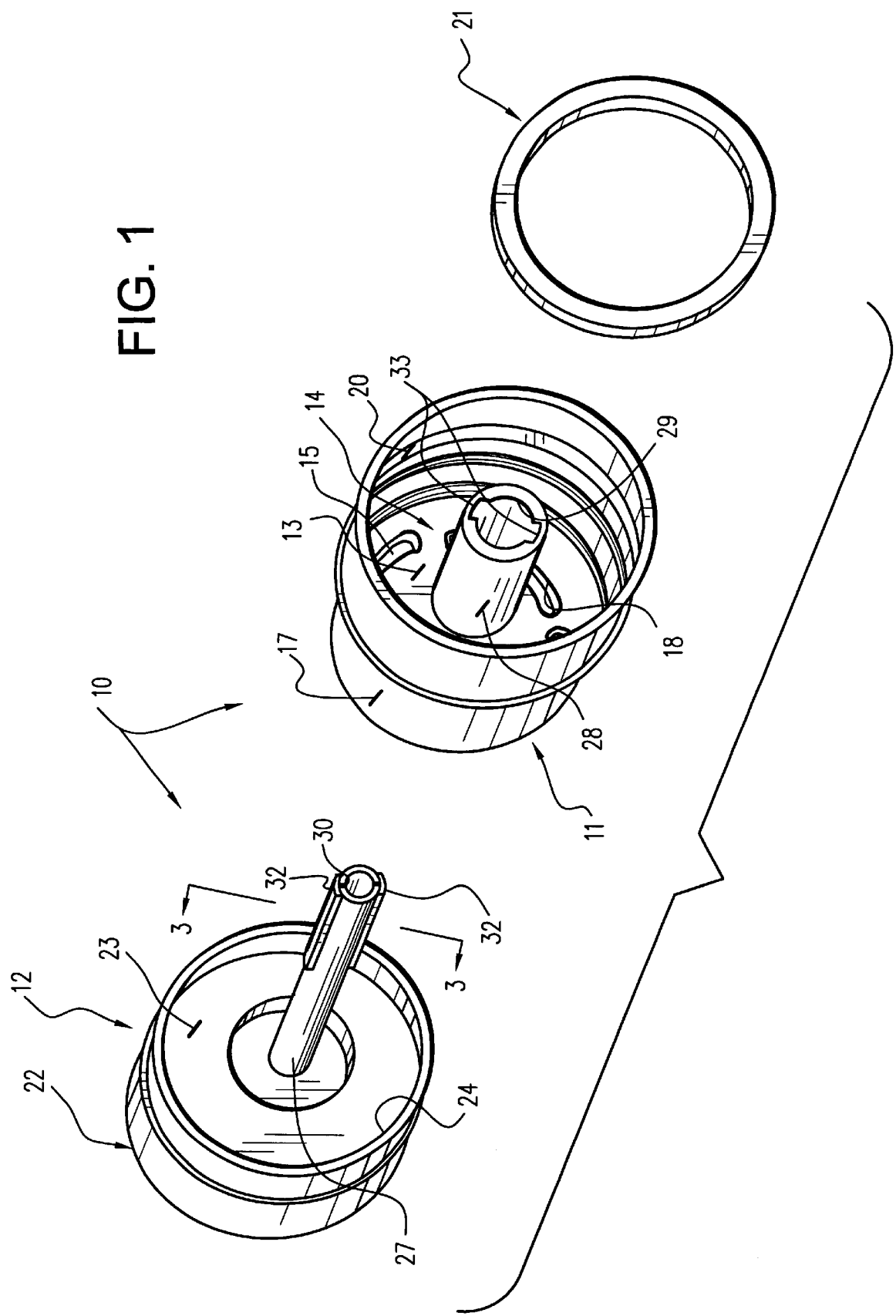

POUR THROUGH AND LOCKING SPILL PROOF CAP

CROSS REFERENCE TO RELATED APPLICATIONS

This utility application is based upon provisional application No. 60/084,061 filed May 4, 1998.

BACKGROUND AND SUMMARY OF THE INVENTION

Consumers are increasingly concerned with the taste, and other attributes, of water that they drink, and therefore many products have been provided for treating tap water to remove a significant portion of the chlorine, or other contaminants, from the water to improve its taste, and even to improve how healthy it is to drink. One tap water treatment system that has been sold for a long time and has been popular is generally shown by U.S. Pat. Nos. 4,695,379, 4,769,144, and 5,211,973 (the disclosures of which are hereby incorporated by reference herein). That system includes a bottle having a neck; a tube containing, or connectable to via a canister, a water treatment material (such as activated carbon) which removes at least some of the chlorine from tap water flowing through it, the tube having a first end resting on the bottle neck while the water treatment material is within the bottle; and a cap which closes off the bottle neck. The bottle is filled by causing water to flow (e.g. from a faucet) through the tube, through the activated carbon into the bottle. When the bottle is sufficiently full, the cap is screwed into contact with the neck, automatically closing off the tube so that water is substantially prevented from flowing through the tube out of the bottle. However water can flow through openings in a first element of the cap between the neck of the bottle and the outside of the tube. A second element of the cap closes off the openings in the first element, but upon tilting of the bottle automatically reciprocates with respect to the first element to uncover the openings to allow water to be dispensed from the bottle neck. A counter is typically provided on the top of the cap second element which the consumer is advised to rotate one position per fill of the bottle to indicate when the water treatment material should be replaced.

While the system as described above is very popular, one drawback associated therewith is it has little portability because whenever the bottle is tilted or inverted the water flows out of the neck. In order to enhance the portability of the system, while not significantly increasing its cost or complexity, according to the present invention the system as described above has been modified so as to allow the cap first and second elements to be moved with respect to each other so that they are locked in a position in which the second element cannot reciprocate with respect to the first element so that water is substantially prevented from flowing out of the bottle. Also a seal is provided between the cap first element and the bottle to also prevent leakage between the cap and the bottle neck.

Also according to the present invention it is desirable to facilitate the replacement of the canister of water treatment material by allowing ready connection and disconnection to and from the tube open second (bottom) end, while providing a secure fit so that the canister does not detach from the tube during normal use. This is accomplished according to the invention by providing a particular stepped smaller diameter portion adjacent the second end of the tube, which makes a friction fit within an interior wall of a connection end of the canister.

According to one aspect of the present invention, there is provided in combination with a bottle having a neck with an interior surface and an exterior surface, the following components: An elongated tube having first and second ends, the first end for operative connection to the bottle neck, and the second end containing or for connection to water treatment material which treats water flowing therethrough from within the tube; A cap attachable to the bottle neck, the cap including at least first and second elements, the first element having a central portion for closing off the first end of the tube and a peripheral portion having a plurality of openings. The cap second element mounted for movement with respect to the first element between open and closed positions while the first end of the tube is closed, and for permitting discharge of liquid from within the bottle in a path between the tube and the bottle neck through the openings. A sealing element that fits within the cap and which provides a liquid tight seal between the cap and the bottle neck interior surface so that liquid cannot flow between the cap and the neck except through the path. And, a locking device which is selectively actuatable to lock the first and second cap elements together in the closed position so as to seal the openings and substantially prevent leakage of water from the bottle even if the bottle is inverted.

In the combination recited above, the cap first element preferably comprises a tubular portion extending from the central portion; and wherein the second element comprises a guide shaft which extends through the tubular portion and is reciprocal within and with respect to the tubular portion; and wherein the locking device comprises surface manifestations on the tubular portion and guide shaft. In the combination set forth above preferably the tubular portion has an end terminus remote from the central portion; wherein the guide shaft is longer than the tubular portion; and wherein the surface manifestations comprise at least one elongated rib on the guide shaft and substantially parallel to the guide shaft, and at least one channel in the tubular portion for receipt of the rib; the rib having a length less than the length of the guide shaft and dimensioned with respect to the tubular portion so that when the cap is in the closed position the rib extends exteriorly of the tubular portion, and the second element may be twisted with respect to the first element so that the rib engages the end terminus of the tubular portion thereby locking the first and second elements in the closed position.

The at least one rib preferably comprises two parallel ribs positioned on opposite sides of the guide shaft (the guide shaft may be solid or hollow), and the at least one channel comprises two opposite channels one for receipt of each of the ribs. The guide shaft typically includes an enlarged end which limits the amount of movement between the first and second elements when moving between the closed and open positions. The second element typically comprises a peripheral lip which engages and seals with the first element when the elements are in the closed and locked position, and—as is conventional—a counter may be provided on top of the second element.

The water treatment material may be in a water canister; and preferably the tube second end comprises a smaller diameter stepped portion; and the canister preferably comprises a first end having a tubular connection including an internal diameter and an external diameter, the internal diameter of the tubular connection being substantially the same as said smaller diameter stepped portion of the tube so that the tube and canister have a secure but releasable friction fit. The water treatment material in the canister preferably comprises a material—such as activated carbon (such as activated carbon in a solid porous matrix with plastic, such as disclosed in U.S. Pat. No. 5,609,759)—capable of removing at least about 50% of the chlorine in tap water flowing therethrough for at least about ten gallons of tap water flowing therethrough.

The sealing element preferably comprises at least one sealing ring of substantially elastomeric material (such as soft plastic, synthetic rubber, or rubber). While the sealing ring may be part of the cap first element, or part of the bottle neck, preferably it is separable from the cap and the bottle. Also the cap first element has a wall portion which releasably engages the bottle neck exterior surface, and a terminus of the wall portion which receives the at least one sealing ring. Also the wall portion of the cap first element preferably has internal screw threads which mate with external screw threads on the bottle neck exterior surface.

According to another aspect of the present invention there is provided in combination with a bottle having a neck and an interior surface and an exterior surface the following: An elongated tube having first and second ends, the first end for operative connection to the bottle neck, and the second end containing or for connection to water treatment material which treats water flowing therethrough from within the tube. A cap attachable to the bottle neck, the cap including at least first and second elements, the first element having a central portion for closing off the first end of the tube and a peripheral portion having a plurality of openings. The cap second element mounted for movement with respect to the first element between open and closed positions while the first end of the tube is closed, and for permitting discharge of liquid from within the bottle in a path between the tube and the bottle neck through the openings. Wherein the water treatment material is in a water treatment canister, wherein the tube second end comprises a smaller diameter stepped portion. And, wherein the canister comprises a first end having a tubular connection including an internal diameter and an external diameter, the internal diameter of the tubular connection being substantially the same as the smaller diameter stepped portion of the tube so that the tube and canister have a secure but releasable friction fit. The water treatment material in the canister preferably is as described above.

According to another aspect of the present invention a method of handling a water bottle which includes a bottle body having a neck with external screw threads, a cap having first and second elements movable with respect to each other, a substantially elastomeric sealing ring for sealing between the cap first element and bottle neck, an internal tube having first and second open ends, and a canister of material for removing at least 50% of the chlorine from at least 10 gallons of tap water which flows therethrough, is provided. The method comprises the steps of: (a) Fitting a canister on the tube second end. (b) Placing the tube into contact with the bottle so that the tube first end rests on the bottle neck and the canister is within the bottle. (c) Causing water to flow into the tube, through the canister to have some chlorine removed therefrom, and then into the bottle. (d) Once the bottle contains the desired amount of water, screwing the cap first element onto the bottle neck so that the sealing ring provides a substantially water tight seal between the cap and the bottle neck and so that the cap first element substantially prevents water from flowing through the tube out the bottle. (e) Effecting relative linear movement between the cap first and second elements by tilting the bottle to cause water to flow between the tube and the neck and through one or more openings in the cap first element, so that water is dispensed from the bottle. (f) When desired, effecting relative twisting movement between the cap first and second elements to lock them in a closed position so that they do not move with respect to each other when the bottle is tilted, and substantially preclude water from flowing out of the bottle when tilted. And, (g) when desired, replacing the canister by moving it off the tube and moving a new canister into operative contact with the tube.

It is the primary object of the present invention to provide a simple yet effective enhancement for an already popular water treatment system by allowing greater portability of the system without spilling, and/or easier replacement—and secure connection—of the water treatment canister. This and other objects of the invention will become clear from an inspection of the detailed description of the invention and from the appended claims.

BRIEF DESCRIPTION OF THE DRAWINGS

FIG. 1 is a top exploded perspective view of the cap and sealing ring of the combination according to the invention;

DETAILED DESCRIPTION OF THE DRAWINGS

FIGS. 1 through 3 and 5 show the cap used in the combination according to the present invention, while FIGS. 1 through 3, 6 and 7 show in most detail the locking components for the elements of the cap that provide new portability to the water treatment system according to the invention.

Figure 3:
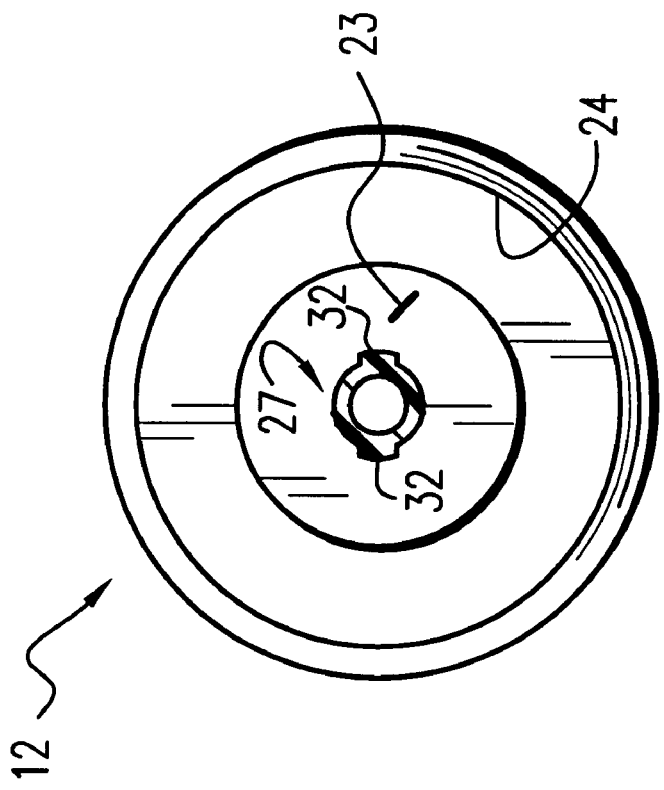
FIG. 3 is a bottom plan view, with the guide shaft shown in cross-section at lines 3—3 of FIG. 1—showing the second element of the cap at FIG. 1.
Figure 2:
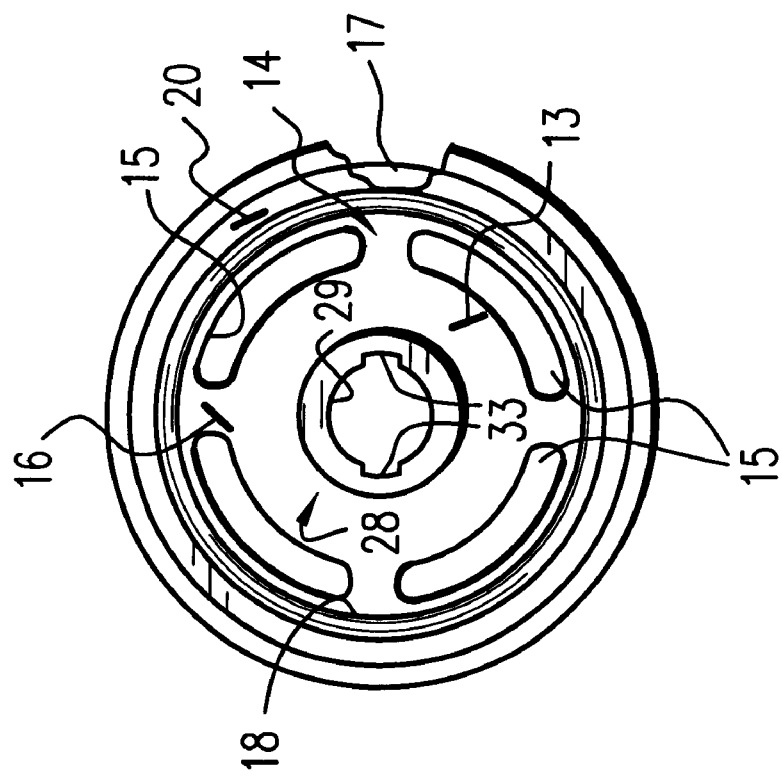
FIG. 2 is a bottom plan view of the first element of the cap of FIG. 1.

FIG. 1 shows a cap according to the invention generally by reference numeral 10, including a first cap element 11, and a second cap element 12. The first cap element 11 has a central portion—which is preferably a flat plate-like portion at one end of the element 11—13, with a peripheral portion 14 having a number of openings 15 therein, as best seen in FIG. 2. Radially extending flanges 16 separate the openings 15 from each other (in the preferred embodiment illustrated four such openings 15 are provided spaced substantially regularly around the peripheral portion 14).

The first cap element 11 also comprises a wall portion 17, which is substantially annular and has an axial length much greater than the thickness of the central portion 13, which releasably engages a bottle neck, such as by internal screw threads 18 which engage the external screw threads on a bottle neck. The first element 11 also preferably comprises an enlarged terminus 20 of the wall portion 17 which mates with a bottle neck and is preferably associated with a sealing element which provides a substantially liquid tight seal between the cap first element 11 and the bottle neck. In the preferred embodiment illustrated in the drawings, that substantially liquid tight seal is provided by at least one sealing ring 21 (see FIGS. 1 and 5) which is distinct from the cap 10 and the bottle neck, but preferably is substantially the same shape as the surface of the terminus 20 that it mates with. The sealing ring 21 is typically substantially elastomeric material, such as a soft plastic, synthetic rubber, natural rubber, or the like, which can be compressed to provide a secure substantially water tight seal.

The cap 10 further comprises (see FIGS. 1, 3, and 5 in particular) the second element 12 for movement with respect to the first element 11 between open and closed positions. The first element 12 includes an inner surface 23 which closes off the openings 15 in a closed position and prevents contaminants from entering the bottle through the openings 15, and a peripheral lip 24 which engages and seals with the first element 11 when the elements 11, 12 are in a closed and locked position with respect to each other. As is conventional, the top surface 22 of the element 12 can have a counter 25 associated therewith with cooperating indicia provided on the counter 25 and the top 22 so that how many refills using the system can be accurately gauged.

The second element 12 also comprises a guide shaft (which may be either solid or hollow) 27 which extends downwardly from the portion 23 and which cooperates with a tubular portion 28 that is part of first element 11, having an interior bore 29 through which the guide shaft 27 slides to guide movement of the second element 12 with respect to the first element 11. The guide shaft 27 has an enlarged free end 30 which can engage the end terminus 31 of the tubular portion 28 (see FIG. 5) to limit the amount of movement of the second element 12 away from the first element 11.

In addition to a guiding and support function, the elements 27, 28 also provide a locking device which is selectively actuated to lock the first and second cap elements 11, 12 together in a closed position to seal the openings 15 and substantially prevent leakage of water from a bottle with which the cap 10 is associated even if the bottle is inverted.

While the locking device may take a wide variety of forms, in the preferred embodiment illustrated in the drawings, the interior opening 29 of the tubular portion 28 includes at least one (preferably two opposite) channel 33 while the guide shaft 27 comprises at least one (preferably two opposite) rib 32. The ribs 32 are substantially parallel to each other and to the guide shaft 27, and are shaped to fit in and cooperate with the channels 33. The channels 33 and ribs 32 may have any desired crosssectional shape, or other surface manifestations may be provided besides the ribs and channels, or the ribs may be provided in the tubular portion 28 and the channels in the guide shaft 27, etc.

Figure 6:
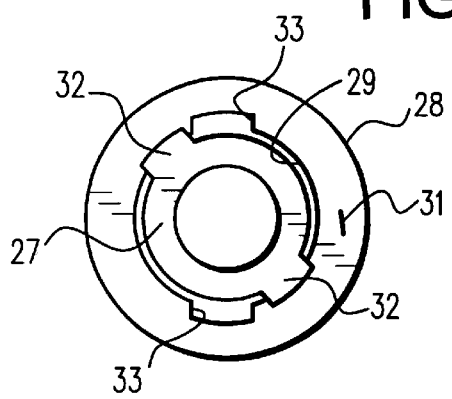
FIG. 6 is a plan detail view showing the locking components of the cap first and second elements shown in the locked position.
Figure 7:
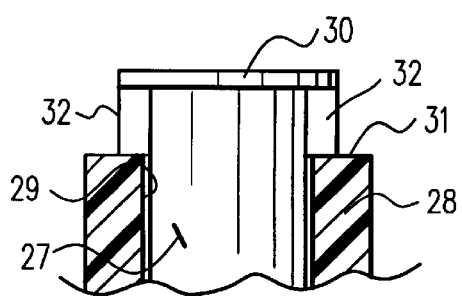
FIG. 7 is a side detail view, partly in cross-section and partly in elevation, of the components of FIG. 8 also in the locked position.

Preferably the guide shaft 27 is not only longer than the tubular portion 28, but the ribs 32 have a length less than the length of the guide shaft 27 and are dimensioned with respect to the tubular portion 28 so that when the cap 10 is in the closed position the ribs 32 extend exteriorly of the tubular portion 28 so that the second element 12 may be twisted (rotated) with respect to the first element 11 so that the ribs 32 engage the end terminus 31 of the tubular portion 28 thereby locking the first and second elements 11, 12 in the closed position. This particular relationship between the elements 11, 12 is illustrated in FIGS. 6 and 7.

Figure 4A:
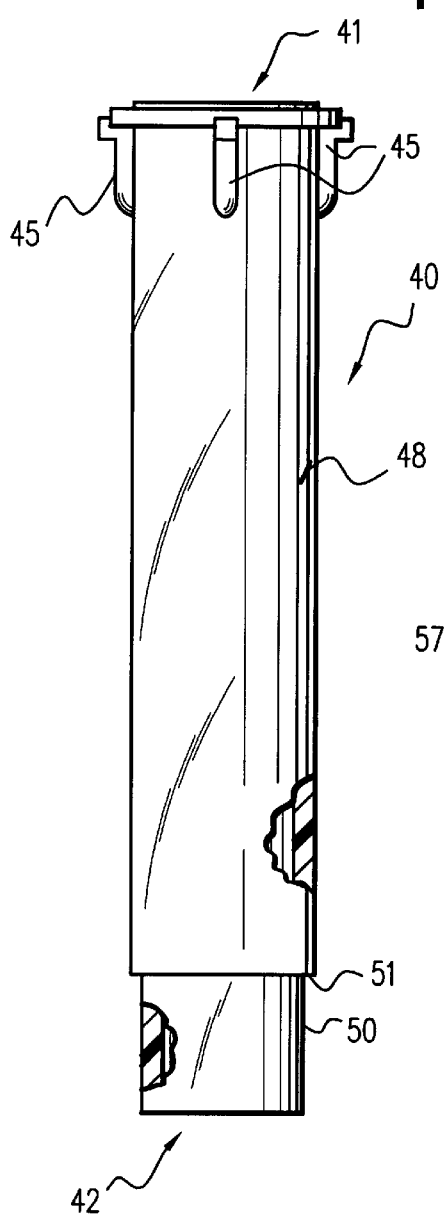
FIG. 4A is a side view of the tube, and FIG. 4B top perspective view of the canister with portions cut away to illustrate the interior filter element, of two other components of the combination according to the invention.
Figure 4B:
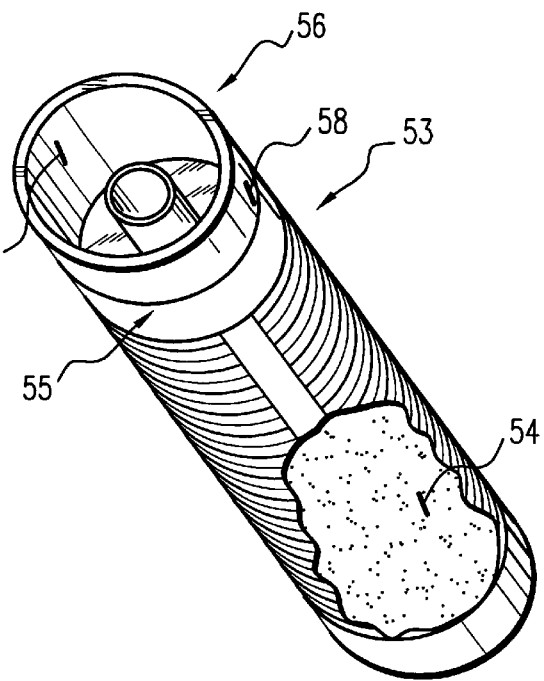

The combination according to the invention also comprises an elongated tube 40 (see FIGS. 4A, 4B and 5) typically of plastic, and having a first open end 41 and a second opening 42. The first end 41 is for operative connection to a bottle 43 neck 44 (see FIG. 5), and may have a plurality of projections 45 (e.g. four evenly spaced projections 45) which engage the top 46 of the neck 44, and the interior surface 47 thereof, but which space the exterior surface 48 from the interior 47 of the neck 44 to allow water flow therebetween. The first end 41 of the tube 40 is basically conventional. The tube 40 second end 42 includes a smaller diameter stepped portion 50 having a stepped shoulder 51. The water treatment material can be within the tube 40, preferably is in a detachable canister 53, for example the water treatment material being a porous block of activated carbon and plastic 54 within an outer plastic housing 55. The outer plastic housing 55, and the material 54 are like the material in the preferred embodiment in U.S. Pat. No. 5,609,759.

The canister 53 has a first end 56 having a tubular connection including an internal diameter 57 and an external diameter 58. The internal diameter 57 is substantially the same as the smaller diameter stepped portion 50 of the tube 40 so that the tube 40 and the canister 53 have a secure but releasable friction fit.

The material 54 is capable of removing at least about 50% of the chlorine in tap water flowing therethrough for at least about ten gallons of tap water, typically at least about 70% of the chlorine for at least about thirty gallons. Also other media may be provided (such as shown in U.S. Pat. No. 5,211,973) within, or associated with, the tube 40, for treating the water.

Figure 5:
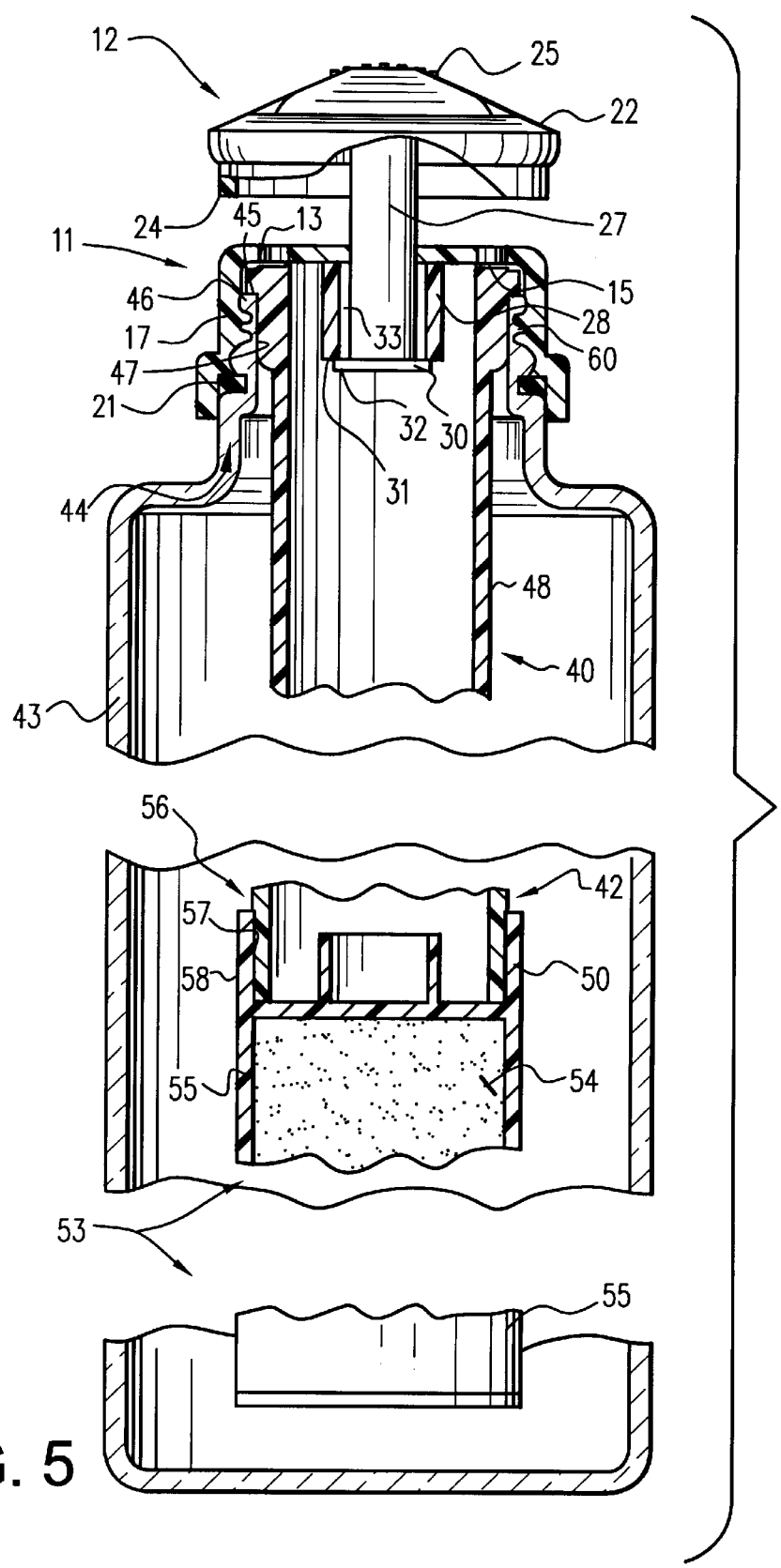
FIG. 5 is a side view, mostly in cross-section and partly in elevation, showing the combination according to the invention, of FIGS. 1 through 4, connected to a bottle and with the cap first element moved to an open position with respect to the cap second element such as occurs when the bottle is titled and water flows out of the bottle.

In the typical use of the combination according to the invention, with the canister 53 first end 56 internal diameter 57 engaging the stepped small diameter portion 50 of the tube 40, the tube 40 is inserted into the bottle 43 to the position illustrated in FIG. 5 where the tube 40 projections 45 are in contact with the bottle 43 so that the tube first end 41 rests on the bottle neck portion 46 and the canister 53 is within the bottle 43. Then tap water is caused to flow through the open top 41 (such as from a faucet) of tube 40 through the material 54 of the canister 53 so that some of the chlorine (at least 50%) is removed from the tap water, then the tap water flows into the bottle 43 exteriorly of the canister 53. Once the bottle 43 contains the desired amount of water, one screws the cap 10 first element 11 onto the bottle neck 44, the internal threads 18 of the cap first element 11 cooperating with external threads 60 on the neck 44. This compresses the sealing ring 21 so that the sealing ring 21 provides a substantially water tight seal between the cap first element 11 and the bottle neck 44 and so that the cap first element 11 central portion 13 blocks off the open first end 41 of the tube 40, as seen in FIG. 5.

When the bottle 43 is tilted, the cap second element 12 slides with respect to the first element 43, until the stop position illustrated in FIG. 5 (where the portion 30 engages the surface 31 as seen in FIG. 5). Water then flows from the bottle 43 past the exterior surface 48 of the tube 40 between the projections 45 and the inner surface 47 of the neck 44 through the openings 45, and between the elements 11, 12.

When it is desired to lock the bottle cap 10 closed so that liquid will not be dispensed even when the bottle 43 is tilted (or dropped), with the elements 11, 12 in the closed position where the lip 24 engages the wall 17, and with the ribs 32 outside of the opening 29, the user twists the second element 12 with respect to the first element 11 so that the ribs 32 are no longer aligned with the channels 33 but instead engage the terminus 31 of the tubular portion 28—as seen in both FIGS. 6 and 7. When in this position, water cannot flow through the area between the neck 44 and the wall portion 17 because of the sealing ring 21, and cannot flow between the elements 11, 12 because they are locked together. Therefore there is substantially no opportunity for water to leak out of the bottle 43.

When desired, the canister 53 is replaced by moving it off the tube 40 second end 42 and moving a new canister 53 into operative contact with the tube 40. In the preferred embodiment illustrated this is typically practiced merely by pulling the tube 40 so that there is no longer a friction fit between the surfaces 50, 57. The movement of a new canister 53 into place establishes a new friction fit between the surfaces 50, 57 with a stop provided by the shoulder 51.

In the preferred embodiment all components are made of suitable plastic, except for the treatment material 54.

While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent structures and methods.

What is claimed is:

1. In combination with a bottle having a neck with an interior surface and an exterior surface:
    an elongated tube having first and second ends, said first end for operative connection to said bottle neck, and said second end containing or connected to water treatment material which treats water flowing therethrough from within said tube;
    a cap attachable to the bottle neck, said cap including at least first and second elements, said first element having a central portion for closing off said first end of said tube and a peripheral portion having a plurality of openings;
    said cap second element mounted for movement with respect to said first element between open and closed positions while said first end of said tube is closed, and for permitting discharge of liquid from within the bottle in a path between said tube and the bottle neck through said openings;
    a sealing element that fits within said cap and which provides a liquid tight seal between said cap and the bottle neck interior surface so that liquid cannot flow between said cap and the neck except through said path; and
    a locking device which is selectively actuatable to lock said first and second cap elements together in said closed position so as to seal said openings and substantially prevent leakage of water from the bottle even if the bottle is inverted.

2. A combination as recited in claim 1 wherein said cap first element comprises a tubular portion extending from said central portion; and wherein said second element comprises a guide shaft which extends through said tubular portion and is reciprocal within and with respect to said tubular portion; and wherein said locking device comprises surface manifestations on said tubular portion and guide shaft.

3. A combination as recited in claim 2 wherein said tubular portion has an end terminus remote from said central portion; wherein said guide shaft is longer than said tubular portion; and wherein said surface manifestations comprise at least one elongated rib on said guide shaft and substantially parallel to said guide shaft, and at least one channel in said tubular portion for receipt of said rib; said rib having a length less than the length of said guide shaft and dimensioned with respect to said tubular portion so that when said cap is in said closed position said rib extends exteriorly of said tubular portion, and said second element may be twisted with respect to said first element so that said rib engages said end terminus of said tubular portion thereby locking said first and second elements in said closed position.

4. A combination as recited in claim 3 wherein said at least one rib comprises two parallel ribs positioned on opposite sides of said guide shaft, and wherein said at least one channel comprises two opposite channels one for receipt of each of said ribs.

5. A combination as recited in claim 4 wherein said guide shaft includes an enlarged end which limits the amount of axial movement between said first and second elements when moving between said closed and said open positions.

6. A combination as recited in claim 4 wherein said second element comprises a peripheral lip which engages and seals with said first element when said elements are in said closed and locked position.

7. A combination as recited in claim 6 further comprising a counter on top of said second element.

8. A combination as recited in claim 3 wherein said water treatment material is in a water treatment canister; and wherein said water treatment material in said canister comprises a material capable of removing at least about 50% of the chlorine in tap water flowing therethrough for at least about ten gallons of tap water flowing therethrough.

9. A combination as recited in claim 8 wherein said tube second end comprises a smaller diameter stepped portion; and wherein said canister comprises a first end having a tubular connection including an internal diameter and an external diameter, said internal diameter of said tubular connection being substantially the same as said smaller diameter stepped portion of said tube so that said tube and canister have a secure but releasable friction fit.

10. A combination as recited in claim 3 wherein said sealing element comprises at least one sealing ring of substantially elastomeric material which is separable from said cap and the bottle; and wherein said cap first element has a wall portion which releasably engages the bottle neck exterior surface, and a terminus of said wall portion which receives said at least one sealing ring.

11. A combination as recited in claim 10 wherein said wall portion of said cap first element has internal screw threads which mate with external screw threads on the bottle neck exterior surface.

12. A combination as recited in claim 2 wherein said water treatment material is in a water treatment canister; and wherein said tube second end comprises a smaller diameter stepped portion; and wherein said canister comprises a first end having a tubular connection including an internal diameter and an external diameter, said internal diameter of said tubular connection being substantially the same as said smaller diameter stepped portion of said tube so that said tube and canister have a secure but releasable friction fit.

13. A combination as recited in claim 12 wherein said water treatment material in said canister comprises a material capable of removing at least about 50% of the chlorine in tap water flowing therethrough for at least about ten gallons of tap water flowing therethrough.

14. A combination as recited in claim 1 wherein said water treatment material is in a water treatment canister; and wherein said water treatment material in said canister comprises a material capable of removing at least about 50% of the chlorine in tap water flowing therethrough for at least about ten gallons of tap water flowing therethrough.

15. A combination as recited in claim 14 wherein said tube second end comprises a smaller diameter stepped portion; and wherein said canister comprises a first end having a tubular connection including an internal diameter and an external diameter, said internal diameter of said tubular connection being substantially the same as said smaller diameter stepped portion of said tube so that said tube and canister have a secure but releasable friction fit.

16. A combination as recited in claim 1 wherein said sealing element comprises at least one sealing ring of substantially elastomeric material which is separable from said cap and the bottle; and wherein said cap first element has a wall portion which releasably engages the bottle neck exterior surface, and a terminus of said wall portion which receives said at least one sealing ring.

17. A combination as recited in claim 16 wherein said wall portion of said cap first element has internal screw threads which mate with external screw threads on the bottle neck exterior surface.

18. In combination with a bottle having a neck with an interior surface and an exterior surface:

an elongated tube having first and second ends, said first end for operative connection to said bottle neck, and said second end containing or connected to water treatment material which treats water flowing therethrough from within said tube;

a cap attachable to the bottle neck, said cap including at least first and second elements, said first element having a central portion for closing off said first end of said tube and a peripheral portion having a plurality of openings;

said cap second element mounted for movement with respect to said first element between open and closed positions while said first end of said tube is closed, and for permitting discharge of liquid from within the bottle in a path between said tube and the bottle neck through said openings;

wherein said water treatment material is in a water treatment canister;

wherein said tube second end comprises a smaller diameter stepped portion; and wherein said canister comprises a first end having a tubular connection including an internal diameter and an external diameter, said internal diameter of said tubular connection being substantially the same as said smaller diameter stepped portion of said tube so that said tube and canister have a secure but releasable friction fit.

19. A combination as recited in claim 18 wherein said water treatment material in said canister comprises a material capable of removing at least about 50% of the chlorine in tap water flowing therethrough for at least about ten gallons of tap water flowing therethrough.

20. A method of handling a water bottle which includes a bottle body having a neck with external screw threads, a cap having first and second elements movable with respect to each other, a substantially elastomeric sealing ring for sealing between the cap first element and bottle neck, an internal tube having first and second open ends, and a canister of material for removing at least 50% of the chlorine from at least 10 gallons of tap water which flows therethrough, comprising the steps of:

(a) fitting a canister on the tube second end;

(b) placing the tube into contact with the bottle so that the tube first end rests on the bottle neck and the canister is within the bottle;

(c) causing water to flow into the tube, through the canister to have some chlorine removed therefrom, and then into the bottle;

(d) once the bottle contains the desired amount of water, screwing the cap first element onto the bottle neck so that the sealing ring provides a substantially water tight seal between the cap and the bottle neck and so that the cap first element substantially prevents water from flowing through the tube out the bottle;

(e) effecting relative linear movement between the cap first and second elements by tilting the bottle to cause water to flow between the tube and the neck and through one or more openings in the cap first element, so that water is dispensed from the bottle;

(f) effecting relative twisting movement between the cap first and second elements to lock them in a closed position so that they do not move with respect to each other when the bottle is tilted, and substantially preclude water from flowing out of the bottle when tilted; and (g) replacing the canister by moving it off the tube and moving a new canister into operative contact with the tube.

* * * * *